United States Patent
Uhrich et al.

(10) Patent No.: US 10,378,400 B2
(45) Date of Patent: Aug. 13, 2019

(54) SYSTEMS AND METHODS FOR PARTICULATE FILTER REGENERATION

(71) Applicant: Ford Global Technologies, LLC, Dearborn, MI (US)

(72) Inventors: Michael James Uhrich, West Bloomfield, MI (US); Joseph Norman Ulrey, Dearborn, MI (US); Ross Dykstra Pursifull, Dearborn, MI (US); Christopher Paul Glugla, Macomb, MI (US); Emil G. Serban, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/653,237

(22) Filed: Jul. 18, 2017

(65) Prior Publication Data
US 2019/0024552 A1    Jan. 24, 2019

(51) Int. Cl.
| | | |
|---|---|---|
| *F01N 3/10* | (2006.01) | |
| *F01N 9/00* | (2006.01) | |
| *F01N 3/023* | (2006.01) | |
| *F02D 37/02* | (2006.01) | |
| *F02D 41/00* | (2006.01) | |
| *F02D 41/02* | (2006.01) | |
| *F02D 41/14* | (2006.01) | |
| *F02D 41/40* | (2006.01) | |

(52) U.S. Cl.
CPC .......... *F01N 3/0234* (2013.01); *F02D 37/02* (2013.01); *F02D 41/029* (2013.01); *F02D 41/0245* (2013.01); *F02D 41/1448* (2013.01); *F02D 41/405* (2013.01); *F01N 3/101* (2013.01); *F01N 9/002* (2013.01); *F01N 2430/06* (2013.01); *F01N 2430/08* (2013.01); *F02D 41/0055* (2013.01); *F02D 2200/0812* (2013.01)

(58) Field of Classification Search
USPC .................. 60/274, 285, 286, 295, 297, 311
See application file for complete search history.

(56) References Cited

U.S. PATENT DOCUMENTS

| | | | |
|---|---|---|---|
| 7,520,260 B2 * | 4/2009 | Nakamura | F01N 3/035 123/299 |
| 8,402,751 B2 | 3/2013 | Bidner et al. | |

(Continued)

OTHER PUBLICATIONS

Flebig, M. et al., "Particulate emissions from diesel engines: correlation between engine technology and emissions," Journal of Occupational Medicine and Toxicology, vol. 9, No. 6, Available Online Mar. 7, 2014, 18 pages.

(Continued)

*Primary Examiner* — Binh Q Tran
(74) *Attorney, Agent, or Firm* — Julia Voutyras; McCoy Russell LLP (57) ABSTRACT

Methods and systems are provided for adjusting engine compression ratio (CR) and spark timing to attain particulate filter (PF) regeneration temperature. In one example, a method may include, in response to PF load reaching a threshold and PF temperature being lower than the PF regeneration temperature, lowering the CR and then selectively adjusting spark timing based on an estimated residual gas fraction (RGF) at the lower CR.

20 Claims, 5 Drawing Sheets

(56) References Cited

U.S. PATENT DOCUMENTS

| | | | |
|---|---|---|---|
| 8,434,450 B2* | 5/2013 | Durrett | F02B 17/005 |
| | | | 123/295 |
| 8,683,786 B2 | 4/2014 | Ruona et al. | |
| 8,833,060 B2 | 9/2014 | Ruhland et al. | |
| 9,453,464 B2 | 9/2016 | Kamada et al. | |
| 2007/0251216 A1* | 11/2007 | Easley, Jr. | F01N 3/025 |
| | | | 60/285 |
| 2010/0139248 A1* | 6/2010 | Najt | F01N 3/106 |
| | | | 60/285 |
| 2012/0167858 A1* | 7/2012 | Kakuda | F02D 41/0072 |
| | | | 123/27 R |
| 2013/0013172 A1* | 1/2013 | Bidner | F02D 41/0025 |
| | | | 701/104 |

OTHER PUBLICATIONS

Hariram, V. et al., "Influence of compression ratio on combustion and performance characteristics of direct injection compression ignition engine," Alexandria Engineering Journal, vol. 54, No. 4, Available Online Jul. 10, 2015, 8 pages.

* cited by examiner

SYSTEMS AND METHODS FOR PARTICULATE FILTER REGENERATION

FIELD

The present description relates generally to methods and systems for adjusting engine compression ratio and spark timing to attain particulate filter regeneration temperature.

BACKGROUND/SUMMARY

Engine combustion using gasoline fuel may generate particulate matter (PM) (such as soot and aerosols) that may be exhausted to the atmosphere. To enable emissions compliance, particulate filters (PF) may be included in the engine exhaust, to filter out exhaust PMs before releasing the exhaust to the atmosphere. Such devices may be periodically or opportunistically regenerated during operation of an engine to decrease the amount of trapped particulate matter. Regeneration is typically achieved by raising a temperature of the PF to a predetermined level for a sustained period, while flowing exhaust gas of a defined composition through the PF in order to burn or oxidize the trapped particulate matter.

Various approaches are provided for regenerating a PF in response to PM loading reaching a threshold amount. In one example, as shown in U.S. Pat. No. 8,833,060, Ruhland et al. disclose a method to increase exhaust temperature when regeneration conditions for a particulate filter are met. The exhaust temperature may be increased by retarding spark timing and/or by post-injection fueling. Further, heaters coupled to the exhaust passage upstream of the particulate filter may be used to increase the temperature of exhaust reaching the particulate filter.

However, the inventors herein have recognized potential disadvantages with the above approach. As one example, extended operation of the engine with a significant amount of spark retard from MBT for the purpose of exhaust heating may cause an increased variation in cylinder indicated mean effective pressure (IMEP) which may reduce combustion stability and trigger a misfire monitor.

The inventors herein have recognized that changing the compression ratio of an engine may have an effect on the uniformity of torque pulses causing engine vibrations as well as a temperature of the exhaust released by the cylinder. These effects may be leveraged for expediting heating of an exhaust particulate filter while reducing reliance on spark retard and improving engine smoothness. Thus in one example, the issues described above may be at least partly addressed by a method comprising: responsive to each of a higher than threshold load and a lower than threshold temperature at an exhaust particulate filter (PF), selectively lowering an engine compression ratio (CR), mechanically, via a variable compression ratio (VCR) mechanism, and selectively adjusting spark timing based on each of a PF temperature and an estimated residual gas fraction (RGF) at the lower CR. In this way, by first increasing exhaust temperature via engine compression ratio adjustments, and then adjusting spark timing based on residual gas fraction, exhaust temperature may be increased for opportunistic regeneration of a PF with decreased engine roughness.

As one example, once a PM load of an exhaust PF reaches a threshold load, the PF temperature may be increased to above a threshold temperature to burn the accumulated load. During operation with a torque converter in a locked position, in order to increase the exhaust temperature (and consequently the PF temperature) to the threshold temperature without increasing engine noise, vibration, and harshness (NVH), the compression ratio (CR) of the engine may be lowered via actuation of a variable compression device, for example to a lowest possible compression ratio. Operating the engine at the lower compression ratio may reduce the engine efficiency relative to the higher compression ratio while increasing the engine out temperature and producing uniform torque pulses. In addition to increasing the exhaust temperature, engine operation at the lower CR may result in a higher amount of residual gas remaining in the engine cylinders, increasing the residual gas fraction (RGF). An increase in the RGF may slow down the combustion process, thereby shifting the spark timing stability limit towards the maximum brake torque (MBT) timing. If after lowering the compression ratio to the lower limit, the PF temperature remains below the threshold temperature, a further increase the PF temperature may be achieved by retarding spark while staying in advance of the spark timing stability limit at the lower CR. During operation with a torque converter in an unlocked position, a higher amount of spark retard may be applied while operating the engine at a higher CR. Once the PF temperature reaches the threshold temperature, the PF may be regenerated opportunistically, or by actively enleaning the engine, and the regeneration history may be updated.

In this way, by lowering an engine CR to increase the exhaust temperature, the reliance on spark retard is reduced and PF regeneration may be enabled with decreased noise, vibration, and harshness (NVH). By adjusting spark timing at the lower CR based on an updated spark timing stability limit, a smaller amount of spark retard from MBT may be applied to attain the desired PF regeneration temperature. By retarding spark timing to within the spark timing stability limit, as updated based on RGF at the lower CR, combustion stability may be maintained and possibility of knock and misfire may be decreased. The technical effect of adjusting the engine CR based on a torque converter position is that engine smoothness during engine operation with spark timing retarded from MBT may be improved. By leveraging the effect of a reduction in compression ratio on exhaust residual amount and temperature, PF regeneration may be expedited, improving engine performance, emissions quality, and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
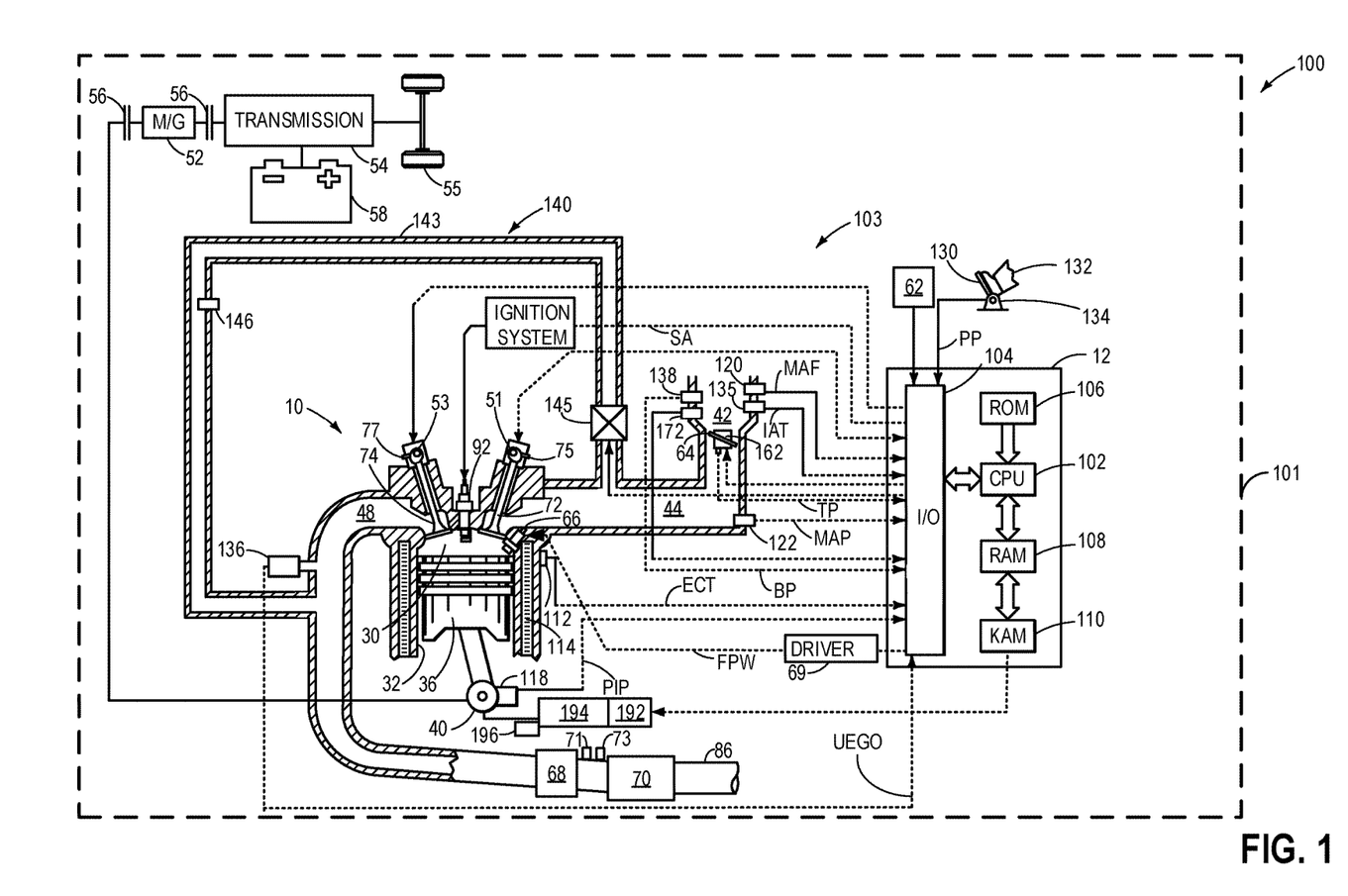
FIG. 1 shows an example engine system including a particulate filter (PF) in a hybrid vehicle.
Figure 2:
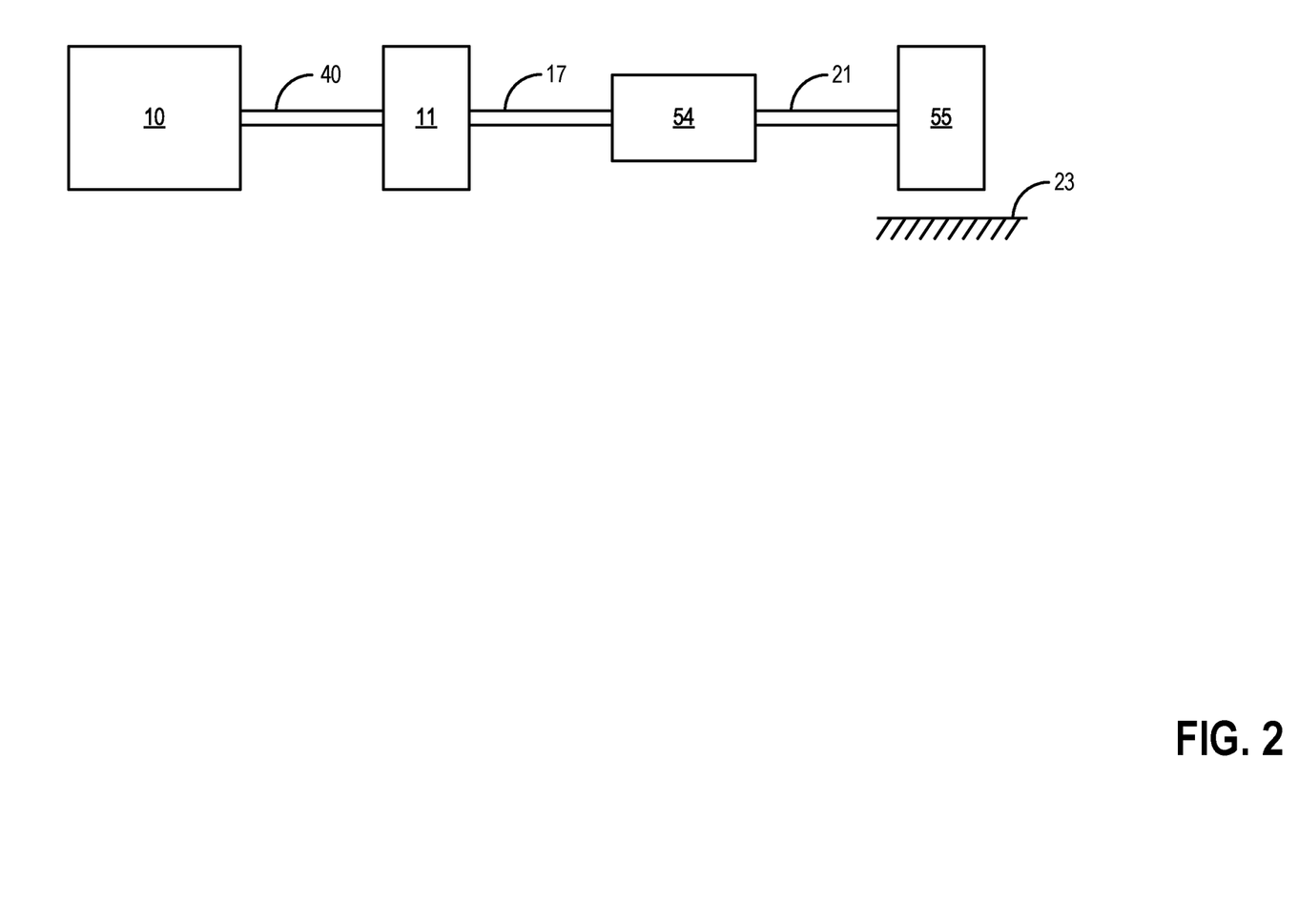
FIG. 2 shows an example vehicle driveline configuration.
Figure 4:
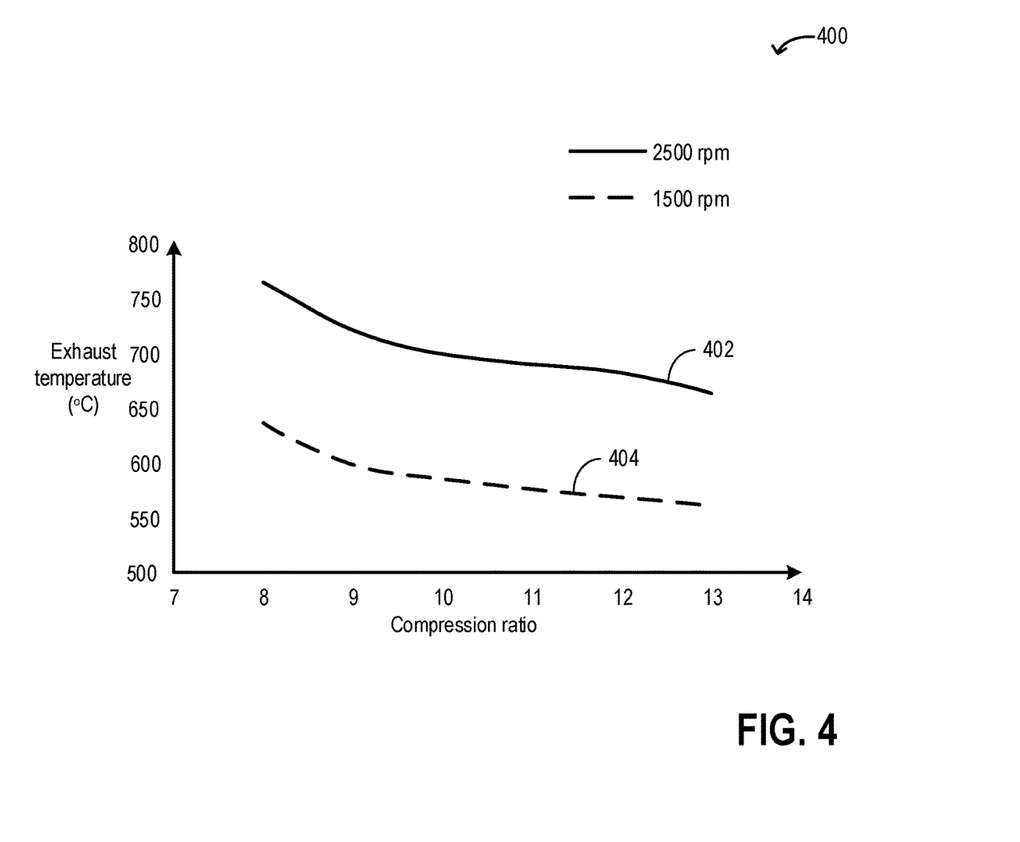
FIG. 4 shows an example relationship between exhaust temperature and engine compression ratio.
Figure 5:
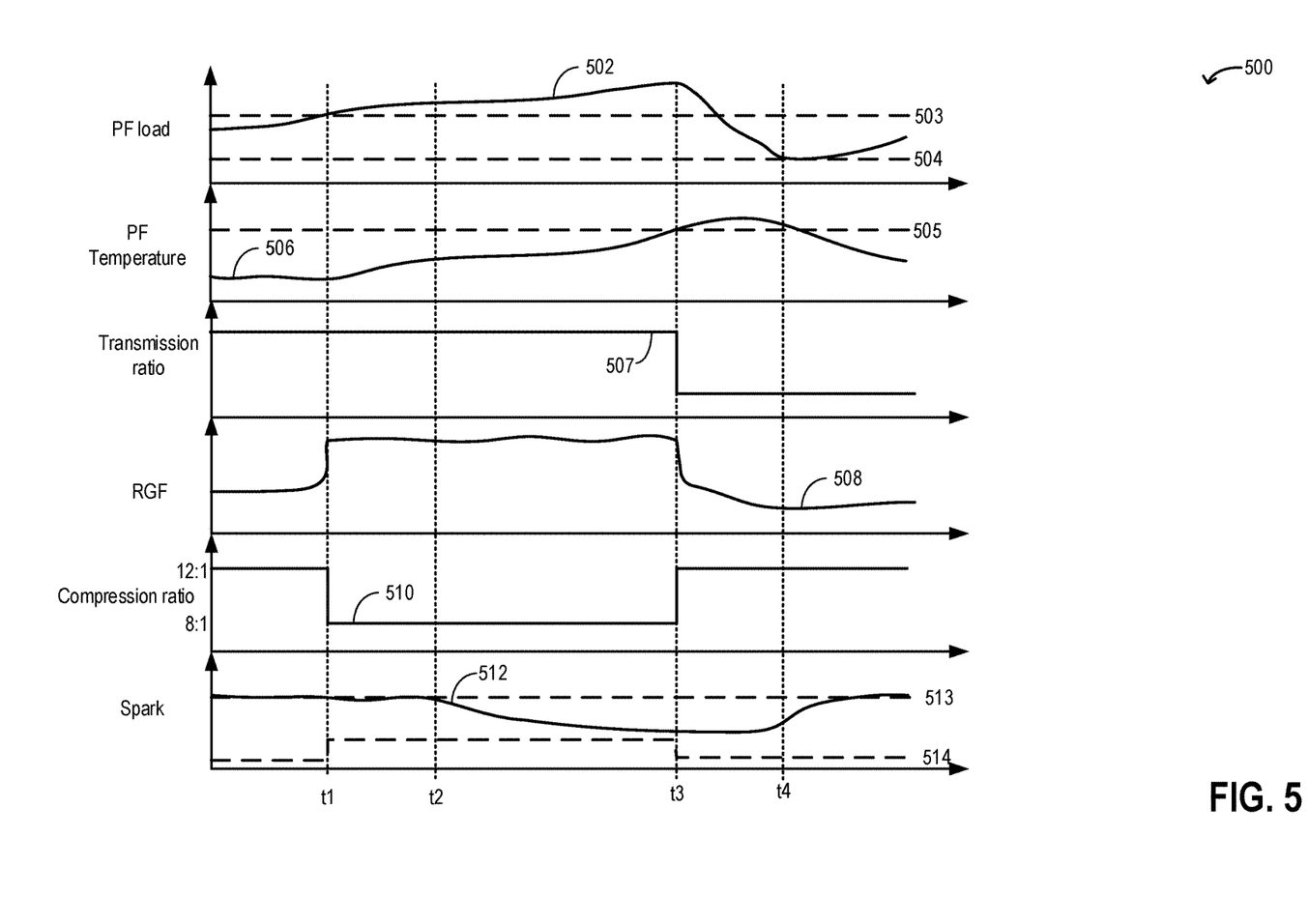
FIG. 5 shows example adjustments to compression ratio and spark timing during PF regeneration.

The following description relates to systems and methods for adjusting engine compression ratio and spark timing to raise particulate filter temperature before initiating filter regeneration. An example engine system including a particulate filter (PF) coupled to a hybrid vehicle is shown in FIG. 1. An example of a vehicle driveline including a torque converter and a transmission system is shown in FIG. 2. An engine controller may be configured to perform a control routine, such as the example routine of FIG. 3, to coordinate adjustments to an engine compression ratio with spark timing adjustments to increase PF temperature for PF regeneration. An example relationship between exhaust temperature and engine compression ratio is shown in FIG. 4. An example of coordinated adjustment of engine compression ratio and spark timing for increasing PF temperature is shown in FIG. 5.

FIG. 1 is a schematic diagram showing a vehicle system 100 comprising a vehicle 101 and an engine system 103. FIG. 1 shows one cylinder of a multi-cylinder engine 10 in the engine system 103. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft 40. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

Engine 10 may be configured as a VCR engine wherein the compression ratio (CR) of each cylinder—a ratio of a cylinder volume when the piston is at bottom-dead-center (BDC) to a cylinder volume when the piston is at top-dead-center (TDC)—can be mechanically altered. The CR of the engine may be varied via a VCR actuator 192 actuating a VCR mechanism 194. In some example embodiments, the CR may be varied between a first, lower CR (wherein the ratio of the cylinder volume when the piston is at BDC to the cylinder volume when the piston is at TDC is smaller) and a second, higher CR (wherein the ratio is higher). In still other example embodiments, there may be predefined number of stepped compression ratios between the first, lower CR and the second, higher CR. Further still, the CR may be continuously variable between the first, lower CR and the second, higher CR (to any CR in between).

In the depicted example, VCR mechanism 194 is coupled to piston 36 such that the VCR mechanism may change the piston TDC position. For example, piston 36 may be coupled to crankshaft 40 via VCR mechanism 194, which may be a piston position changing mechanism that moves the piston closer to or further from the cylinder head, thus changing the position of the piston and thereby the size of combustion chamber 30. A position sensor 196 may be coupled to the VCR mechanism 194 and may be configured to provide feedback to controller 12 regarding the position of VCR mechanism 194 (and thereby the CR of the cylinder).

In one example, changing the position of the piston 36 within the combustion chamber also changes the relative displacement of the piston within the cylinder. The piston position changing VCR mechanism may be coupled to a conventional cranktrain or an unconventional cranktrain. Non-limiting examples of an unconventional cranktrain to which the VCR mechanism may be coupled include variable distance head crankshafts and variable kinematic length crankshafts. In one example, crankshaft 40 may be configured as an eccentric shaft. In another example, an eccentric may be coupled to, or in the area of, a piston pin, with the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In another example, the VCR mechanism may include a hydraulic pressure-reactive, air pressure-reactive, or mechanically reactive piston. Further still, the VCR mechanism may include a multi-link mechanism, a bent rod mechanism, or other VCR mechanizations.

It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (e.g., a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to VCR actuator 192 to actuate VCR mechanism 194 to a first position where the piston has a smaller effective displacement within the combustion chamber. As another example, the engine may be operated at a second, higher compression ratio by the controller sending a signal to VCR actuator 192 to actuate VCR mechanism 194 to a second position where the piston has a larger effective displacement within the combustion chamber. Continuous VCR systems may continuously optimize the combustion phasing and the thermal efficiency to provide the best compression ratio between the higher compression ratio and lower compression ratio limits at the given operating conditions. Changes in the piston displacement and the resulting change in engine compression ratio may be advantageously used to adjust exhaust temperature. As elaborated herein, an increase in exhaust temperature may be desired for regeneration of an exhaust particulate filter 70.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 69. In this manner, the fuel injector 66 provides what is known as direct injection of fuel into the combustion chamber 30. The fuel injector may be mounted in the side of the combustion chamber (as shown) or in the top of the combustion chamber, for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30. Each cylinder of engine 10 may include a spark plug 92 for initiating combustion. Ignition system may provide an ignition spark to combustion chamber 30 via spark plug 92 in response to spark advance signal SA from controller 12.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 135, the ambient humidity sensor 172, and barometric pressure (BP) sensor 138. The IAT sensor 135 estimates intake air temperature to be used in engine operations and provides a signal to the controller 12. Similarly, the BP sensor 138 estimates the ambient pressure and the ambient humidity sensor estimates ambient humidity for engine operations and provides respective signals to the controller 12. In one example, an intake oxygen sensor may be used to estimate ambient humidity. The intake passage 42 may further include a mass air flow sensor 120 and a manifold air pressure sensor 122 for providing respective signals MAF and MAP to the controller 12. During a tip-in (when the accelerator pedal is engaged), the controller may determine tip-in parameters including rate of change of air charge and peak air charge based on inputs from the mass air flow sensor 120.

An exhaust gas sensor 136 is shown coupled to the exhaust passage 48 upstream of an emission control device 68. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

An emission control device 68 is shown arranged along the exhaust passage 48 downstream exhaust gas sensor 136. The device 68 may be a three-way catalyst (TWC), NOx trap, various other emission control devices, or combinations thereof. In some embodiments, during operation of the engine 10, the emission control device 68 may be periodically reset by operating at least one cylinder of the engine within a particular air/fuel ratio.

A particulate filter (PF) 70 is shown arranged along the exhaust passage 48 downstream of the emission control device 68. The particulate filter 70 may be a gasoline particulate filter or a diesel particulate filter. A substrate of the particulate filter 70 may be made of ceramic, silicon, metal, paper, or combinations thereof. During operation of the engine 10, particulate filter 70 may capture exhaust particulate matter (PMs), such as ash and soot (e.g., from unburned hydrocarbons) in order to reduce vehicle emissions. The soot may clog the surfaces of the particulate filter thereby creating an exhaust backpressure. The exhaust backpressure may negatively influence the engine performance. Increase in backpressure may also increase an amount of residual gas remaining in the cylinders after an exhaust stroke, thereby increasing the residual gas fraction (RGF) of the cylinder. Once the particulate filter 70 becomes fully loaded with soot (e.g., soot load on the particulate filter exceeds a soot load threshold), the backpressure may be too high for proper exhaust expulsion. Work used to expel exhaust from the engine 10 increases in order to overcome the backpressure described above. In order to avoid high backpressure, when the PF soot loading reaches a threshold load, the engine 10 may opportunistically regenerate the filter either passively or actively.

A pressure sensor 71 may be coupled to the exhaust passage 48 upstream of the particulate filter 70 to estimate exhaust pressure. The controller may estimate the soot loading on the exhaust based on the exhaust pressure estimated via the sensor 71. Also, a residual gas fraction (RGF), indicative of an amount of residuals remaining in a cylinder after the exhaust stroke (not pumped out of the cylinders), may be estimated based on input from the exhaust pressure sensor 71 immediately after exhaust valve closing. A temperature sensor 73 may be coupled to the to the exhaust passage 48 upstream of the particulate filter 70 to estimate exhaust temperature. Temperature of the particulate filter 70 may be estimated based on inputs from the temperature sensor 73.

Passive regeneration may occur during higher load engine operations when the PF temperature increases beyond a threshold temperature (e.g., 600° C.), where the soot on the particulate filter may combust. During certain engine operating conditions, such as during vehicle deceleration or braking, fuel injection to all or some of the engine cylinders may be temporarily suspended. During such an operation, known as a deceleration fuel shut-off (DFSO) event, combustion in the unfueled engine cylinders may be suspended and a higher amount of air (oxygen) may flow through the exhaust PF. When a DFSO event occurs at higher than threshold PF temperature, the oxygen flowing through the PF may be opportunistically used to passively regenerate the PF. However, during short drive cycles (such as during in city driving), DFSO events may not occur frequently and also a duration of a DFSO may not be long enough for completion of PF regeneration.

During conditions when the soot load on the PF exceeds the threshold soot load and conditions for passive regeneration are not available, the PF may need to be actively regenerated to improve exhaust emissions. Active regeneration may occur via the controller 12 signaling for alterations to engine operations in order to actively increase PF temperature to the threshold temperature independent of the engine load. In one example, this may be achieved by retarding spark timing from maximum brake torque (MBT). However, retarding spark timing may increase fuel consumption (based on vehicle driving conditions) and thereby adversely affect fuel economy. In one example, there may be an increased fuel consumption of 14-25% with a corresponding increase of 150-300° C. in exhaust temperature. Also, a higher amount of spark retard may cause an increased coefficient of variation (COV) resulting in higher cycle-to-cycle cylinder indicated mean effective pressure (IMEP) which may reduce combustion stability and trigger a misfire monitor.

As elaborated herein, the controller may lower a compression ratio (CR) of some or all of the engine cylinders to actively increase exhaust temperature. Operating the engine at a lower compression ratio may reduce the engine efficiency relative to the higher compression ratio while increasing the engine thermal output. A relation between exhaust temperature and engine compression ratio is shown in FIG. 4. Engine operation at a lower CR may result in uniform torque pulses and increased engine smoothness during engine operation with spark timing retarded from MBT. In contrast, operating the engine at a higher CR and with spark timing retarded from MBT may result in increased engine noise, vibration, and harshness (NVH). If it is determined that the PF load is higher than the threshold load and the torque converter is locked while the PF temperature is lower than the threshold temperature, the controller may lower the engine compression ratio (CR) via the VCR mechanism 194. In one example, the compression ratio is lowered to the next possible compression ratio lower than the current compression ratio. In another example, the compression ratio may be lowered to the lowest possible CR. Engine operation at the lower CR may increase exhaust temperature and also result in a higher amount of residuals remaining in the engine cylinders, thereby increasing the residual gas fraction (RGF). If after lowering the compression ratio to the lower limit, the PF temperature remains below the threshold temperature, spark timing may be retarded from MBT to further increase the PF temperature. Therefore, the amount of spark retard may be based on each of a difference between the threshold temperature and the estimated PF temperature at the lower CR, and an estimated RGF at the lower CR. Herein, the amount of spark retard required to heat the exhaust may be lower than if operating with the higher CR, resulting in a smoother engine operation.

Figure 3:
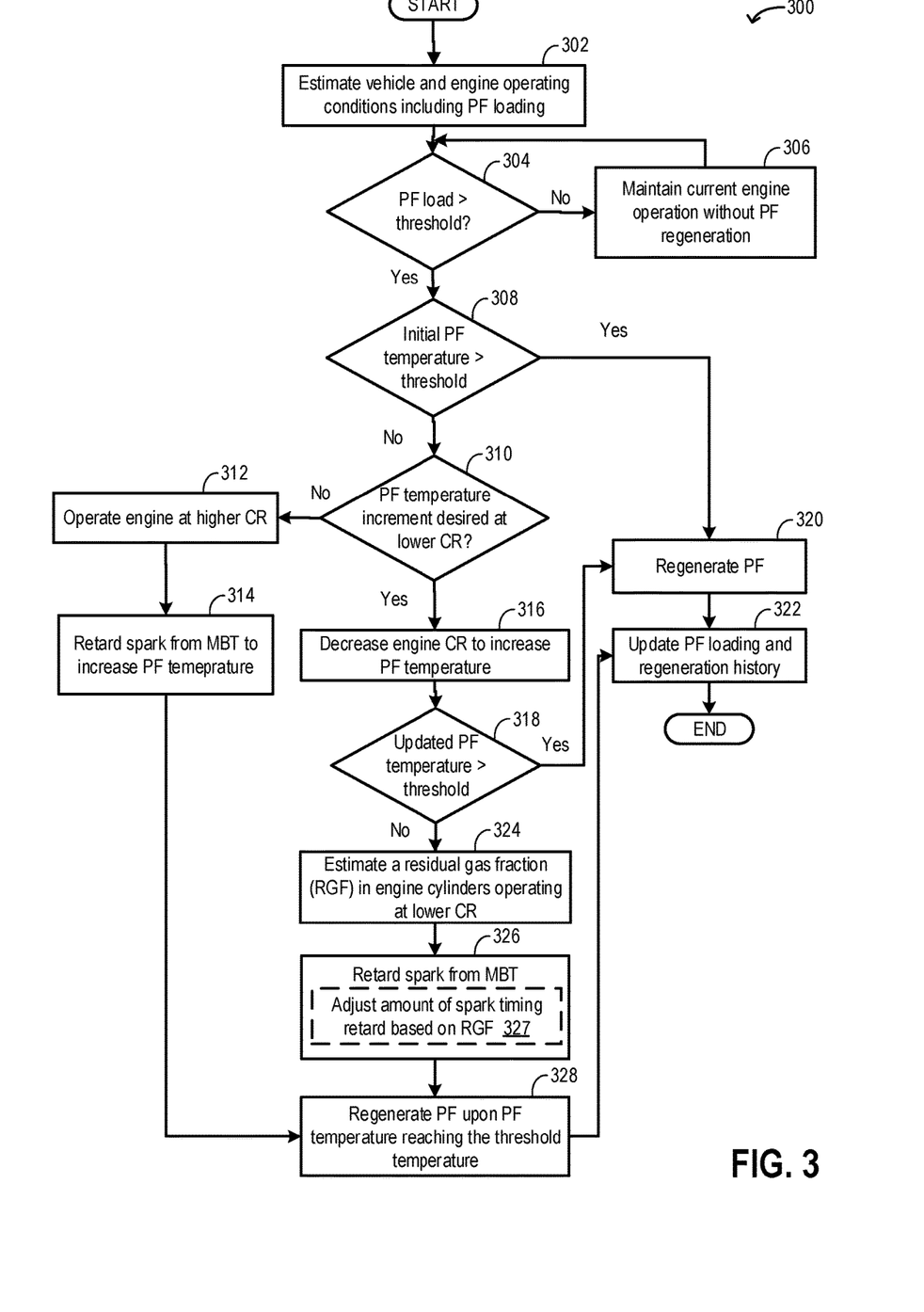
FIG. 3 shows a flow chart illustrating an example method that can be implemented to increase exhaust temperature for PF regeneration.

As elaborated with reference to FIG. 3, by coordinating adjustments to a compression ratio of the engine with spark timing adjustments, particulate filter temperatures may be raised while reducing the need for spark retard and thereby improving combustion stability.

Engine system 103 may further include an exhaust gas recirculation (EGR) system 140 to route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust AFR from oxygen sensor 136, exhaust pressure from exhaust pressure sensor 71, exhaust temperature from exhaust temperature sensor 73, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122, and ambient humidity from sensor 172. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to an increase in soot load in the particulate filter 70 to above a threshold load, as estimated based on input from the exhaust pressure sensor 71, the controller may send a signal to the VCR mechanism 194 to mechanically reduce the compression ratio of the cylinder in order to increase exhaust temperature. After adjusting the compression ratio of the cylinder, in response to a further desire for exhaust temperature increase, the controller may then send a signal to the spark plug 92 to retard spark timing based on the cylinder compression ratio and the exhaust temperature.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation. In one example, battery 58 may supply power to a hydraulic system and/or an electric motor for operation of the lifting mechanism. In another example, a separate on-board battery (different from traction battery 58), charged using engine power may supply power to a hydraulic system and/or an electric motor for operation of the lifting mechanism.

Referring to FIG. 1, internal combustion engine 10, further described herein with particular reference to FIG. 2, is shown coupled to torque converter 11 via crankshaft 40. Torque converter 11 is also coupled to transmission 54 via turbine shaft 17. In one example, transmission 54 is a stepped-gear ratio transmission. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 54 comprises an electronically controlled transmission with a plurality of selectable discrete gear ratios. Transmission 54 may also comprises various other gears, such as, for example, a final drive ratio (not shown). Alternatively, transmission 54 may be a continuously variable transmission (CVT).

Transmission 54 may further be coupled to vehicle wheels 55 via axle 21. Vehicle wheels 55 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

In one example, non-uniform engine torque pulses (increased variation in combustion torque from cylinder fire to cylinder fire) may be produced during engine operation with spark timing retarded from MBT at a higher engine compression ratio (CR) causing increased noise, vibration, and harshness (NVH) levels. During engine operation at a lower gear, the torque converter may be unlocked (clutch is fully disengaged) and engine torque pulses may not be transmitted from the engine 10 to the transmission system 54. However, during engine operation at a higher gear, the torque converter may be locked (clutch is fully engaged) and engine torque pulses may be transmitted from the engine 10 to the transmission system 54. Therefore, during engine operation at a higher gear, if engine operation with spark timing retarded from MBT is desired (such as for increasing exhaust temperature), the engine may be operated at a lower CR such that uniform engine torque pulses are produced causing a decrease in the NVH levels. Selection of engine CR based on a current gear ratio and torque converter status (locked or unlocked) is discussed with reference to FIG. 3.

In this way, the systems of FIGS. 1 and 2 enable a vehicle system, comprising: a vehicle, a torque converter including a lock-up clutch, a transmission system, an engine, a variable compression ratio mechanism for mechanically altering a piston displacement within each engine cylinder, an exhaust passage including a particulate filter (PF), and each of a pressure sensor and a temperature sensor coupled upstream of the PF, and a controller with computer readable instructions for: responsive to each of a lower than threshold PF temperature while PF load being higher than a threshold load and the torque converter being locked, actuating the variable compression ratio mechanism to a position corresponding to a lower compression ratio (CR), and responsive to PF temperature at the lower CR being lower than the threshold temperature, retarding spark timing towards an updated spark timing stability limit based on a residual gas fraction (RGF) in the cylinder at the lower CR.

FIG. 3 shows an example method 300 for adjusting an operation of the engine system to increase temperature of an exhaust particulate filter (such as PF 70 in FIG. 1) for PF regeneration. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, exhaust pressure, manifold pressure, manifold air flow, battery state of charge, etc. The controller may determine PF soot loading based on exhaust pressure as estimated via an exhaust pressure sensor (such as pressure sensor 71 in FIG. 1) coupled to the exhaust passage upstream of the PF. The controller may determine the PF loading based on a calculation using a look-up table with the input being exhaust pressure and the output being PF loading. The controller may also determine a current engine compression ratio (CR) based on the input from a position sensor (such as position sensor 196 in FIG. 1) coupled to the VCR mechanism.

At 304, the routine includes determining if the PF soot load is greater than a first threshold load. The first threshold PF load may correspond to an upper threshold load or a threshold exhaust backpressure above which exhaust expulsion from cylinders may be adversely affected, negatively influencing engine performance. If it determined that the PF load is lower than the first threshold, at 206, engine operation with the current cylinder compression ratio and spark timing may be maintained and the PF may not be regenerated.

If it is determined that the PF load is higher than the first threshold load, at 208, the routine includes determining if the initial (current) PF temperature is higher than a threshold temperature. The threshold temperature may correspond to the lowest PF temperature desired to burn the soot accumulated on the PF, thereby regenerating the PF. The soot accumulated on the PF may be oxidized at the higher than threshold PF temperature when the engine is operated at leaner than stoichiometric air-fuel ratio conditions (increased oxygen in exhaust).

The controller may determine the threshold temperature based on the PF load. In one example, as the PF load increases, the threshold temperature may be increased due to the higher amount of thermal energy desired for burning the accumulated soot. The controller may determine the initial PF temperature based on input from the exhaust temperature sensor (such as temperature sensor 73 in FIG. 1) coupled to the exhaust passage upstream of the PF. As an example, the threshold PF temperature may be 600° C. If it is determined that the initial PF temperature is above the threshold temperature, at 220, the PF may be passively regenerated. During regeneration of the PF, the high temperature exhaust flowing through the PF may burn the soot accumulated on the filter. In one example, the passive regeneration may be carried out during lean engine operation when the excess oxygen in the exhaust may facilitate in combusting the soot accumulated on the PF. In another example, the passive regeneration may be carried out during a DFSO event when there is an increased oxygen flow via the PF. In one example, active PF regeneration may be carried out by post-injecting fuel for increasing exhaust temperature, however, active PF regeneration may adversely affect fuel efficiency. As the soot loading on the filter decreases, the exhaust back pressure may also correspondingly decrease. At 320, during PF regeneration, the controller may update the remaining soot load on the PF based on a change in exhaust pressure as the soot load reduces or based on a duration of operating at the higher than threshold temperature. As such, as the soot load on the filter decreases, the exhaust back pressure may also correspondingly decrease. The controller may save the details of the current regeneration, such as the duration of regeneration, the temperature of regeneration, and the timing of the regeneration in a database for future reference.

If it is determined that the PF loading is above the threshold loading but the initial PF temperature is below the threshold temperature, it may be inferred that PF regeneration may not be initiated at the current PF temperature. Accordingly, the controller may adjust engine operation to raise the exhaust temperature to raise the PF temp.

At 310, the routine includes determining if the PF temperature increment is desired at a lower engine compression ratio (CR is the difference between cylinder volumes at TDC relative to BDC). During engine operation at a lower CR, uniform torque pulses may be produced thereby reducing noise, vibration, and harshness (NVH) levels relative to engine operation at a higher CR. However, as described herein, during operation at the lower CR, a limit for an amount of spark retard from MBT may be lower than the limit for the amount of spark retard from MBT while operating the engine at the higher CR. In one example, when operating the engine at a lower CR with a first amount of spark retard from MBT, 90% of heat release from the engine (causing increase in exhaust temperature and PF temperature) may take place by 30° ATC. In another example, when operating the engine at a higher CR with the same, first amount of spark retard from MBT, 90% of heat release from the engine may take place by 50° ATC. Due to the heat release at a higher angle, there is a higher torque variation during engine operation at the higher CR, resulting in increased NVH.

During vehicle operation at a lower transmission gear, the torque converter may be unlocked (such as when a torque converter lock-up clutch is fully disengaged) to decouple vibration input into transmission, etc. As the torque converter is not directly coupled to the transmission system (such as via an input shaft), torque pulses may not be transmitted to the transmission system, thereby reducing the overall NVH. Therefore, during vehicle operation at a lower transmission gear, when the torque converter is unlocked, the engine may be operated at the higher CR without significant increase in perceivable NVH. In contrast, when torque converter is locked (such as when the lock-up clutch fully engaged) the engine output torque is directly transferred via the torque converter clutch to an input shaft of the transmission system. As the torque converter is directly coupled to the transmission system, torque pulses may be directly transmitted to the transmission system, thereby increasing the overall vehicle NVH. Therefore, during vehicle operation at a higher transmission gear, when the torque converter is locked, the engine may be desired to be operated at a lower CR to reduce the overall NVH. Therefore, by operating the engine at a lower CR, a smoother production of exhaust heat may be carried out with a substantially equal amount of fuel consumption and production of an average brake torque relative to engine operation at a higher CR.

If it is determined that the vehicle is operated at a higher transmission gear with the torque converter locked, it may be inferred that engine operation at a lower CR may be desired for increasing PF temperature while maintaining a lower NVH.

Therefore, at 316, the controller may decrease the engine compression ratio from the current CR to a lowest possible compression ratio. As an example, the controller may reduce the compression ratio of the cylinder from 12:1 to 8:1. The controller may send a signal to the VCR actuator coupled to the VCR mechanism to mechanically adjust the position of the piston within the combustion chamber. The position of the piston may be raised towards the cylinder valves in order to reduce the effective cylinder volume. By raising the piston by the highest possible amount, the lowest engine CR may be attained. As such, if it is determined that the current CR is the lowest possible engine CR, the piston position may not be moved any further, and the current CR may be maintained. In one example, the CR of all the engine cylinders may be reduced concurrently to increase the thermal output from each of the cylinders. In another example, the CR of a first group of cylinders may be reduced while the remaining (second group) engine cylinders may be operated at the current (higher) CR. Increased exhaust heat supplied from the first group of cylinders may be sufficient to increase the PF temperature to the threshold temperature.

In another embodiment, the engine may comprise two or more cylinder banks coupled to separate exhaust manifolds with each exhaust manifold comprising a distinct PF. As an example, if the PF load in a first PF coupled to a first exhaust passage corresponding to a first cylinder bank exceeds a threshold load and the PF temperature is below the threshold, CR of each cylinder of the first cylinder bank may be reduced to increase temperature of the first PF while the cylinders in the remaining engine bank(s) may be operated to the current CR.

During engine operation at the lower compression ratio, the spark timing may be maintained at MBT and the exhaust temperature may increase due to inefficient combustion resulting in increased engine thermal output. In one example, operating the engine at a lower CR of 8:1 may increase the exhaust temperature by 75-100° C. FIG. 4 shows an example plot 400 relating engine CR to exhaust temperature. The x-axis of plot 400 denotes engine compression ratio and the y-axis denotes exhaust temperature (in ° C.) upstream of the PF as estimated via an exhaust temperature sensor.

The first plot 402 shows a variation in exhaust temperature with changing CR at an engine speed of 2500 rpm and the second plot 404 shows a variation in exhaust temperature with changing CR at an engine speed of 1500 rpm. For each of the first plot and the second plot (engine operating at different engine speeds), the exhaust temperature may be inversely proportional to CR and the exhaust temperature may increase with decreasing CR. The exhaust temperature increases at a higher rate at lower CRs relative to the rate of change of exhaust temperature at higher CRs. For a given engine speed, the exhaust temperature at CR 8:1 is higher than the exhaust temperature at CR 12:1. Also, for a given CR, the exhaust temperature may be higher at a higher engine speed.

In this way, in order to increase exhaust temperature to the threshold temperature for PF regeneration, CR may be reduced to the lowest CR at a first approach. As engine operation at a lower CR may not significantly increase fuel consumption, PF temperature may be increased without significant fuel penalty.

Once the engine is operating at a lower CR, the controller may update the estimation of the PF temperature and at 318, the routine includes determining if the updated PF temperature has reached the threshold temperature suitable for PF regeneration. If it is determined that the PF temperature has increased to the threshold temperature, at 320, the PF may be regenerated during a leaner than stoichiometric engine operation or during a DFSO event when the increased oxygen in the exhaust may be used to oxidize the accumulated soot. PF regeneration may be continued until the PF load reduces to below a second threshold load. The second threshold PF load may be a lower threshold, lower than the first threshold PF load. Once the PF loading reduces to below the second threshold load, it may be inferred that the PF regeneration is complete and PF temperature does not need to be maintained above the threshold temperature. In one example, upon completion of PF regeneration, the engine CR may be increased to the engine CR prior to PF regeneration, or to a CR based on current engine operating conditions. In another example, upon completion of PF regeneration, the engine CR may be increased to an engine CR different from the CR prior to PF regeneration.

Returning to 318, if it is determined that the updated PF temperature at the lower engine CR is lower than the threshold temperature, it may be inferred that the exhaust temperature may have to be further increased to attain the threshold temperature suitable for PF regeneration. At 324, a residual gas fraction (RGF) which is an estimate of an amount of residuals remaining in the cylinders (not pumped out of the cylinders) after combustion may be estimated for the engine cylinders. In one example, the RGF may be an estimate of the total amount of residuals remaining in each engine cylinder after closing of the exhaust valve. In another example, the RGF may be an estimate of an average amount of residuals remaining in each engine cylinder after closing of the exhaust valve. During engine operation at a lower CR, the clearance volume of each cylinder increases, thereby increasing the amount of residual trapped in a cylinder (increased RGF). The controller may estimate the RGF based on each of ambient pressure, exhaust pressure, exhaust temperature, cylinder pressure, engine compression ratio, and engine operating conditions including engine speed, engine temperature, engine load, etc. In one example, when a vehicle is operating at higher altitudes, where the ambient pressure is lower, the RGF may be lower relative to RGF at lower altitudes (considering that all other engine operating conditions and engine CR remain substantially same). As such, at lower engine load conditions, during lower exhaust flow-rate, there may not be any significant pressure drop across the exhaust catalyst (coupled to the exhaust passage upstream of the PF) and the exhaust pressure estimation upstream of the PF may be substantially equal to the cylinder pressure (pressure in the combustion chamber). However, at higher engine load conditions, during higher exhaust flow rate, there may be a pressure loss across the exhaust catalyst. The controller may estimate the cylinder pressure taking into account the pressure loss across the catalyst as estimated as a function of exhaust flow rate. The RGF may increase with an increase in exhaust backpressure (due to increased exhaust gas density), hence during a higher than threshold PF loading, there may be an increase in the RGF. In one example, the controller may make a logical determination regarding the RGF based on logic rules that are a function of parameters ambient pressure, exhaust pressure, exhaust temperature, cylinder pressure, engine compression ratio, and engine operating conditions. In another example, the controller may determine the RGF based on a calculation using a look-up table with the input being ambient pressure, exhaust pressure, exhaust temperature, cylinder pressure, engine compression ratio, and engine operating conditions and the output being RGF.

At 326, in order to further increase PF temperature, spark timing may be retarded to a first spark timing from maximum brake torque (MBT) timing. MBT timing may be determined based on the engine operating conditions as estimated in step 202. By retarding spark timing, combustion efficiency may be decreased thereby further increasing exhaust temperature. As the exhaust temperature is first increased by decreasing CR, the difference between the updated PF and the threshold temperature may be lower, thereby allowing attainment of the threshold temperature by retarding spark by a smaller amount relative to the amount of spark retard needed to increase the exhaust temperature solely based on spark timing adjustments. By reducing the amount of spark retard used for attaining the threshold temperature, noise, vibration, and harshness (NVH) quality may be improved.

Retarding the spark timing includes, at 327, adjusting the amount of spark retard (from MBT) at the first spark timing based on the RGF. When the engine is operated at the lower CR, the clearance volume of the engine cylinders may increase, thereby increasing the RGF. Therefore, during operation at a lower CR and at a higher PF loading (with correspondingly high exhaust back pressure), the RGF may be higher.

An increase in the RGF may cause a corresponding shift in a spark timing stability limit towards the MBT. The spark timing stability limit may correspond to a combustion stability limit and operating the engine with a spark timing further retarded away from the stability limit may result in increased coefficient of variation (COV) resulting in higher cycle-to-cycle cylinder indicated mean effective pressure (IMEP) which may reduce combustion stability and trigger a misfire monitor. Therefore, the spark timing stability limit may be further based on the COV, which in turn is based on the RGF, in order to maintain the COV of IMEP within a threshold.

The amount of spark retard at the first spark timing may be further based on the difference between the updated (current) PF temperature and the threshold PF temperature (as desired for PF regeneration). As an example, if the difference between the updated PF temperature and the threshold PF temperature is lower, the spark timing may be retarded away from the MBT, however, if the difference between the updated PF temperature and the threshold PF temperature is higher, the spark timing may be further retarded away from MBT and shifted towards the spark timing stability limit. In one example, the controller may determine the amount of spark retard at the first spark timing based on a calculation using a look-up table with the input being RGF and difference between the updated PF temperature and the threshold PF temperature and the output being the amount of spark retard from MBT.

At 328, PF regeneration may be carried out once the PF temperature reaches the threshold temperature. The PF may be regenerated opportunistically during leaner than stoichiometric engine operation or during DFSO events. The controller may also initiate PF regeneration by actively enleaning the engine. During regeneration of the PF, the high temperature exhaust flowing through the PF may burn the soot accumulated on the filter. PF regeneration may be continued until the PF load reduces to below the second threshold loading. Once the PF loading reduces to below the second threshold loading, it may be inferred that the PF regeneration is complete and PF temperature may no longer be desired to be maintained above the threshold temperature. In one example, upon completion of PF regeneration, the spark timing may be adjusted to the spark timing prior to the PF regeneration and the engine CR may be increased to the engine CR prior to PF regeneration. In another example, upon completion of PF regeneration, the spark timing may be adjusted to a spark timing based on current conditions, the current spark timing different from the spark timing prior to the PF regeneration and the engine CR may be increased to an engine CR based on current conditions, the current CR different from the CR prior to PF regeneration. As such, the controller may update the spark timing based on current engine operating conditions and the spark timing may be advanced towards MBT to improve engine efficiency.

If it is determined that the vehicle is operated at a lower transmission gear with the torque converter unlocked, it may be inferred that the engine may be operated at a higher CR for increasing PF temperature while maintaining a lower NVH. Therefore at 312, the CR may be maintained at the current, higher CR.

At 314, in order to further increase PF temperature to the threshold temperature, spark timing may be retarded to a second spark timing from MBT timing. The amount of spark retard (from MBT) at the second spark timing may be based on the RGF at the higher CR. When the engine is operated at the higher CR, the clearance volume of the engine cylinders may decrease, thereby decreasing the RGF. Therefore, during operation at a higher CR, the RGF may be lower relative to engine operation at a lower CR. Based on the RGF at the higher CR, the spark timing stability limit may be updated. In one example, the spark timing stability limit at the lower CR may be closer to MBT relative to the spark timing stability limit at the higher CR. Therefore, when operating at the higher CR, it is possible to increase an amount of spark retard from MBT relative to the amount of spark retard used during operation at a lower CR while maintaining spark timing within the corresponding spark timing stability limit. In this way, the second spark timing is further retarded from MBT relative to the first spark timing.

The amount of spark retard at the second spark timing may be further based on the difference between the current PF temperature and the threshold PF temperature (as desired for PF regeneration). As an example, if the difference between the updated PF temperature and the threshold PF temperature is lower, the spark timing may be retarded away from the MBT, however, if the difference between the updated PF temperature and the threshold PF temperature is higher, the spark timing may be further retarded away from MBT and shifted towards the spark timing stability limit. In one example, the controller may determine the amount of spark retard at the second spark timing based on a calculation using a look-up table with the input being RGF and difference between the current PF temperature and the threshold PF temperature and the output being the amount of spark retard from MBT. From there on the routine may proceed to step 328 and PF regeneration may be carried out once the PF temperature reaches the threshold temperature.

As an example, each of CR and spark timing adjustments during a PF regeneration may be based on each of a position of a torque converter (such as if the torque is locked position or unlocked position) and a difference between a measured PF temperature at a current CR (as estimated at step 302) and the threshold temperature desired for PF regeneration. During a first exhaust PF regeneration, the CR may be lowered and a PF may be regenerated at a lower CR with a first amount of spark retard from MBT. In comparison, during a second PF regeneration, the CR may be maintained at a current, higher CR, and the PF may be regenerated at a higher CR with a second amount of spark retard from MBT, the second amount higher relative to the first amount. Then, during a third PF regeneration, the CR may be lowered and a PF may be regenerated at a lower CR while maintaining spark timing at MBT. During the first regeneration, the torque converter is in a locked position and a difference between a measured PF temperature at the current CR and the threshold temperature is smaller, and during the second regeneration, the torque converter is in an unlocked position and the difference between the measured PF temperature at the current CR and the threshold temperature is higher. During the third regeneration, the torque converter is in the locked position and the difference between the measured PF temperature at the current CR and the threshold temperature may be lower than the difference at each of the first and the second regenerations. Further, the first amount of spark retard may be based on the RGF at the lower CR while the second amount of spark retard may be based on the RGF at the higher CR, the second amount of spark retard larger than the first amount of spark retard. In this way, PF temperature may be increased by a combination of CR adjustment and spark timing retard to attain the threshold temperature for PF regeneration while reducing the fuel penalty associated with the increase in engine thermal output.

FIG. 5 shows an example operating sequence 500 illustrating example adjustments to engine compression ratio and spark timing for attaining a desired temperature for particulate filter (PF) regeneration. The horizontal (x-axis) denotes time and the vertical markers t1-t4 identify significant times in PF regeneration.

The first plot, line 502, shows variation in PF soot load over time. Dashed line 503 denotes an upper threshold load above which the PF is to be regenerated and the dashed line 504 denotes a lower threshold load at which the generation may be discontinued. The second plot, line 506, shows PF temperature as estimated based on input from an exhaust temperature sensor coupled to the exhaust passage upstream of the PF. Dashed line 505 denotes the threshold temperature desired for PF regeneration. The third plot, line 507, denotes a transmission gear ratio. The fourth plot, line 508, shows the engine residual gas fraction (RGF) as estimated based on input from an exhaust pressure sensor coupled to the exhaust passage upstream of the PF. The fifth plot, line 510, shows an engine compression ratio (CR). The sixth plot, line 512, shows spark timing relative to maximum brake torque (MBT) timing. Dashed line 513 denotes MBT timing as determined based on the engine operating conditions and dashed line 514 denotes a spark timing stability limit as dynamically estimated based on the RGF.

Prior to time t1, as the engine is operating, exhaust soot is trapped in the PF before being released to the atmosphere. However, at this time, the PF soot load is below the upper threshold 503 (lower exhaust back pressure) and therefore PF regeneration is not initiated. The upper threshold 503 may be a threshold soot load above which the exhaust back pressure increases and engine performance is degraded. In one example, upper threshold 503 may be calibrated prior to engine operation based on empirically determined back-pressures. Alternatively, upper threshold 503 may be calibrated during engine operation based on measured or modeled exhaust backpressure. Also during this time, the PF temperature is below the threshold temperature 505. The threshold temperature 505 may be a temperature of the PF that enables expedited burning of soot from the filter when oxygen is flowed there-through. For optimal engine efficiency, the engine is operated at a higher CR. Due to engine operation at the higher compression ratio, the clearance volume is decreased and the amount of residuals left in each cylinder after completion of an exhaust stoke of the cylinder is lower (resulting in a lower value of RGF 508). Spark timing is maintained at MBT since no additional heating is required. Based on engine operating conditions such as engine load, the transmission system is operated at a higher gear ratio.

At time t1, in response to the PF soot load increasing to above the upper threshold 503, it is inferred that PF regeneration is desired. In an alternate example, the threshold 503 may correspond to a higher PF loading and PF regeneration may be desired in anticipation of the PF load reaching the upper threshold 503 imminently (that is, before the PF soot load actually reaches the upper threshold 503). For example, PF regeneration may be determined to be imminently required when a rate of increase of PF load is higher than a threshold rate, or when the PF load reaches a threshold percentage of a fully loaded filter. In order to regenerate the PF by burning the accumulated soot, the PF temperature is commanded to be raised above the threshold temperature 505. As the transmission system is being operated at a higher gear ratio, it is inferred that the torque converter is in a locked position, thereby directly transmitting torque pulses from the engine to the transmission system. At time t1, in order to increase exhaust temperature and correspondingly increase the PF temperature while reducing the overall engine perceivable noise, vibration, and harshness (NVH) arising from operating with a locked torque converter, the CR for each engine cylinder is mechanically decreased, for example from a higher CR setting of 12:1 to a lower CR setting of 8:1, via actuation of a variable compression ratio (VCR) mechanism. At the lower CR, the torque pulses are more uniform, therefore even if the pulses are transmitted via the torque converter, the operator may not perceive an increase in NVH. The VCR mechanism mechanically alters a piston displacement within a cylinder, and lowering the CR includes mechanically reducing the piston displacement within the cylinder. Between time t1 and t2, A the engine is operated at the lower compression ratio, the PF temperature increases consistently. However, due to operation at the lower compression ratio, the clearance volume is increased and the amount of residuals left in each cylinder after an exhaust stoke increases, thereby increasing the RGF value. Further, an increase in exhaust back pressure caused by the increasing PF load also causes an increase in the RGF. Due to the increase in RGF, the spark timing stability limit may be advanced towards MBT.

At time t2, based on the lower than threshold PF temperature while operating at the lower CR, it is inferred that even as the PF loading is increasing, PF regeneration cannot be carried out due to the PF temperature not increasing to the desired threshold. In order to further increase exhaust temperature and the corresponding PF temperature, between time t2 and t3, spark timing is retarded from MBT while maintaining engine operation at the lower CR. In order to maintain combustion stability, the spark timing retard is limited to within the spark timing stability limit.

Due to engine operation at the lower CR and the spark retard, at time t3, the exhaust temperature increases and PF temperature reaches the threshold temperature 505. As the PF temperature increases to the threshold temperature 505, the soot load accumulated on the PF starts burning opportunistically. Also, at time t3, based on changes in engine operating conditions such as engine load, the gear ratio is decreased and consequently the torque converter is unlocked. As the torque converter is decoupled, it is inferred that engine torque pulses will not be transmitted via the torque converter, therefore, the engine can be operated at a higher CR without increasing the NVH. Accordingly, at time t3, the engine CR is increased to the higher CR (e.g., to 12:1). Due to the increase in the CR, there is a corresponding decrease in RGF. As the RGF decreases, the spark timing stability limit is retarded towards MBT.

Between time t3 and t4, the PF is regenerated and the soot load on the PF progressively decreases. As the PF load decreases, the exhaust back pressure may also correspondingly decrease, thereby further reducing the RGF. As the ongoing PF regeneration is an exothermic reaction, further increase in exhaust temperature (PF temperature) is not desired to sustain the regeneration process. Therefore, spark timing may be maintained and is not be retarded further.

At time t4, it is observed that the PF load has reached the lower threshold 504 indicating that the PF regeneration is completed and it is no longer desired to maintain the PF temperature above the threshold temperature 505. In order reduce fuel penalty and improve engine efficiency, at t4, the spark timing is advanced towards MBT. As the PF regeneration is complete and the spark timing is restored to MBT, the PF temperature decreases to below the threshold 505. After time t4, with ongoing engine operation, soot accumulates on the PF. For optimal engine operations, the spark timing is maintained at MBT and the engine CR is maintained at the higher CR of 12:1.

In this way, by first increasing exhaust temperature by reducing engine CR and then retarding spark, a lower amount of spark retard may be used to attain a desired PF regeneration temperature, thereby reducing fuel penalty. By adjusting a spark timing stability limit based on RGF and then limiting an amount of spark retard to remain within the spark timing stability limit combustion stability may be maintained and possibility of knock may be decreased. The technical effect of adjusting the engine CR based on a torque converter state is that PF temperature may be decreased by retarding spark timing from MBT, without increasing perceptible NVH arising from torque pulse transmission through the torque converter. In this way, by using a combination of engine CR adjustments and spark timing retard, a PF may be periodically or opportunistically regenerated to improve engine performance.

An example engine method comprises: responsive to each of a higher than threshold load and a lower than threshold temperature at an exhaust particulate filter (PF), selectively lowering an engine compression ratio (CR), mechanically, via a variable compression ratio (VCR) mechanism, and selectively adjusting spark timing based on each of a PF temperature and an estimated residual gas fraction (RGF) at the lower CR. In any preceding example, additionally or optionally, wherein the estimated RGF includes a fraction of residuals remaining after completion of an exhaust stroke in each engine cylinder, the method further comprising, estimating the RGF at the lower CR based on each of an exhaust pressure measured upstream of the PF, and the lower CR. In any or all of the preceding examples, additionally or optionally, wherein selectively lowering the CR includes, in response to a torque converter being in a locked position, lowering the CR from a current CR to a lowest possible CR, and in response to the torque converter being in an unlocked position, maintaining the CR at the current CR. In any or all of the preceding examples, additionally or optionally, wherein selectively adjusting spark timing includes, in response to the PF temperature at the lower CR being higher than the threshold temperature, maintaining the spark timing at maximum brake torque (MBT) timing, and in response to the PF temperature at the lower CR being lower than the threshold temperature, retarding spark timing to a first spark timing based on a difference between the threshold temperature and the PF temperature at the lower CR. In any or all of the preceding examples, additionally or optionally, wherein retarding the spark timing to the first spark timing includes adjusting a spark timing stability limit based on the estimated RGF at the lower CR and retarding spark timing from MBT to the first spark timing while staying in advance of the adjusted spark timing stability limit. In any or all of the preceding examples, additionally or optionally, wherein adjusting spark timing stability limit includes advancing the spark timing stability limit towards MBT as the estimated RGF increases. In any or all of the preceding examples, additionally or optionally, maintaining the CR at the current CR includes, in response to the PF temperature at the current CR being lower than the threshold temperature, retarding spark timing from MBT to a second spark timing based on a difference between the threshold temperature and the PF temperature at the current CR. In any or all of the preceding examples, additionally or optionally, wherein retarding the spark timing to the second spark timing includes adjusting the spark timing stability limit based on the estimated RGF at the current CR, and retarding spark timing from the first spark timing to the second spark timing while staying in advance of the adjusted spark timing stability limit at the current CR. In any or all of the preceding examples, additionally or optionally, wherein the second spark timing is further retarded from MBT relative to the first spark timing, and wherein the current CR is higher than the lower CR. In any or all of the preceding examples, additionally or optionally, wherein the variable compression ratio mechanism mechanically alters a piston displacement within a cylinder, and wherein lowering the CR includes mechanically reducing the piston displacement within the cylinder, and increasing the CR includes mechanically increasing the piston displacement within the cylinder.

Another engine example method comprises: during a first exhaust particulate filter (PF) regeneration, lowering a compression ratio (CR), and regenerating a PF at the lower CR with a first amount of spark retard from maximum brake torque (MBT) timing, the first amount based on a residual gas fraction (RGF) at the lower CR, and during a second PF regeneration, maintaining the CR, and regenerating the PF at a higher CR with a second amount of spark retard from MBT, the second amount based on the RGF at the higher CR, the second amount of spark retard larger than the first amount of spark retard. In any preceding example, additionally or optionally, wherein the lowering and the raising the CR is from a current CR, the lowering achieved via mechanical actuation of a variable compression ratio (VCR) mechanism. In any or all of the preceding examples, additionally or optionally, wherein during the first regeneration, a torque converter is in a locked position and a difference between a measured PF temperature at the current CR and a threshold temperature is smaller, and wherein during the second regeneration, the torque converter is in an unlocked position and the difference between the measured PF temperature at the current CR and the threshold temperature is higher. Any or all of the preceding examples further comprising, additionally or optionally, during a third PF regeneration, lowering the CR from the current CR, and regenerating the PF at the lower CR while maintaining spark timing at MBT, wherein during the third regeneration, the torque converter is in the locked position and the difference between the measured PF temperature at the current CR and the threshold temperature is lower than the difference at each of the first and the second regeneration. Any or all of the preceding examples further comprising, additionally or optionally, during the first PF regeneration, estimating the RGF based on exhaust pressure at the lower CR, and during the second PF regeneration, estimating the RGF based on exhaust pressure at the higher CR, wherein the RGF at the lower CR is higher than the RGF at the higher CR. Any or all of the preceding examples further comprising, additionally or optionally, during the first PF regeneration, reducing an amount of spark retard limit from MBT based on the RGF at the lower CR, and during the second PF regeneration, increasing the amount of spark retard limit from MBT based on the RGF at the higher CR. In any or all of the preceding examples, additionally or optionally, wherein the first amount of spark retard from MBT is lower than the amount of spark retard limit at the lower CR, and wherein the second amount of spark retard from MBT is lower than the amount of spark retard limit at the higher CR.

In yet another example, a vehicle system comprises: a vehicle, a torque converter including a lock-up clutch, a transmission system, an engine, a variable compression ratio mechanism for mechanically altering a piston displacement within each engine cylinder, an exhaust passage including a particulate filter (PF), and each of a pressure sensor and a temperature sensor coupled upstream of the PF, and a controller with computer readable instructions for: responsive to each of a lower than threshold PF temperature while PF load being higher than a threshold load and the torque converter being locked, actuating the variable compression ratio mechanism to a position corresponding to a lower compression ratio (CR), and responsive to PF temperature at the lower CR being lower than the threshold temperature, retarding spark timing towards an updated spark timing stability limit based on a residual gas fraction (RGF) in the cylinder at the lower CR. In any preceding example, additionally or optionally, wherein the RGF in the cylinder is estimated based on input from the exhaust pressure sensor at the lower CR, and wherein the updated spark timing stability limit is advanced towards maximum brake torque (MBT) as the RGF increases. In any preceding example, additionally or optionally, wherein the retarding spark timing includes retarding spark timing from MBT by an amount based on a difference between the PF temperature at the lower CR and the threshold temperature, the amount increased as the difference between the PF temperature at the lower CR and the threshold temperature increases, the threshold temperature based on PF load.

In a further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to each of a higher than threshold load and a lower than threshold temperature at an exhaust particulate filter (PF),
selectively lowering an engine compression ratio (CR) by actuating a variable compression ratio (VCR) mechanism to mechanically alter a piston position within a cylinder of an engine; and
selectively adjusting spark timing based on each of a PF temperature and an estimated residual gas fraction (RGF) at the lower CR.

2. The method of claim 1, wherein the estimated RGF includes a fraction of residuals remaining after completion of an exhaust stroke in each engine cylinder, the method further comprising estimating the RGF at the lower CR based on each of an exhaust pressure measured upstream of the PF and the lower CR.

3. The method of claim 2, wherein selectively lowering the CR includes, in response to a torque converter being in a locked position, lowering the CR from a current CR to a lowest possible CR, and, in response to the torque converter being in an unlocked position, maintaining the CR at the current CR.

4. The method of claim 3, wherein selectively adjusting spark timing includes, in response to the PF temperature at the lower CR being higher than the threshold temperature, maintaining the spark timing at maximum brake torque (MBT) timing, and, in response to the PF temperature at the lower CR being lower than the threshold temperature, retarding spark timing to a first spark timing based on a difference between the threshold temperature and the pf temperature at the lower CR.

5. The method of claim 4, wherein retarding the spark timing to the first spark timing includes adjusting a spark timing stability limit based on the estimated RGF at the lower CR and retarding spark timing from MBT to the first spark timing while staying in advance of the adjusted spark timing stability limit.

6. The method of claim 5, wherein adjusting the spark timing stability limit includes advancing the spark timing stability limit towards MBT as the estimated RGF increases.

7. The method of claim 5, wherein maintaining the CR at the current CR includes, in response to the PF temperature at the current CR being lower than the threshold temperature, retarding spark timing from MBT to a second spark timing based on a difference between the threshold temperature and the PF temperature at the current CR.

8. The method of claim 7, wherein retarding the spark timing to the second spark timing includes adjusting the spark timing stability limit based on the estimated RGF at the current CR, and retarding spark timing to the second spark timing while staying in advance of the adjusted spark timing stability limit at the current CR.

9. The method of claim 7, wherein the second spark timing is further retarded from MBT relative to the first spark timing, and wherein the current CR is higher than the lower CR.

10. The method of claim 1, wherein the VCR mechanism mechanically alters a piston displacement within the cylinder, and wherein lowering the CR includes mechanically reducing the piston displacement within the cylinder, and increasing the CR includes mechanically increasing the piston displacement within the cylinder.

11. A method, comprising:
during a first exhaust particulate filter (PF) regeneration, lowering a compression ratio (CR) by actuating a variable compression ratio (VCR) mechanism to mechanically alter a piston position within a cylinder of an engine, and regenerating a PF at the lower CR with a first amount of spark retard from maximum brake torque (MBT) timing, the first amount based on a residual gas fraction (RGF) at the lower CR; and
during a second PF regeneration, maintaining the CR, and regenerating the PF at a higher CR with a second amount of spark retard from MBT, the second amount based on an RGF at the higher CR, the second amount of spark retard larger than the first amount of spark retard.

12. The method of claim 11, wherein the lowering the CR is from a current CR.

13. The method of claim 12, wherein, during the first PF regeneration, a torque converter is in a locked position and a difference between a measured PF temperature at the current CR and a threshold temperature is smaller, and, during the second PF regeneration, the torque converter is in an unlocked position and the difference between the measured PF temperature at the current CR and the threshold temperature is higher.

14. The method of claim 13, further comprising, during a third PF regeneration, lowering the CR from the current CR, and regenerating the PF at the lower CR while maintaining spark timing at MBT, wherein, during the third regeneration, the torque converter is in the locked position and the difference between the measured PF temperature at the current CR and the threshold temperature is lower than the difference at each of the first and second regenerations.

15. The method of claim 11, further comprising, during the first PF regeneration, estimating the RGF based on exhaust pressure at the lower CR, and, during the second PF regeneration, estimating the RGF based on exhaust pressure at the higher CR, wherein the RGF at the lower CR is higher than the RGF at the higher CR.

16. The method of claim 15, further comprising, during the first PF regeneration, reducing an amount of spark retard limit from MBT based on the RGF at the lower CR, and during the second PF regeneration, increasing the amount of spark retard limit from MBT based on the RGF at the higher CR.

17. The method of claim 16, wherein the first amount of spark retard from MBT is lower than the amount of spark retard limit at the lower CR, and wherein the second amount of spark retard from MBT is lower than the amount of spark retard limit at the higher CR.

18. A vehicle system, comprising:
a vehicle;
a torque converter including a lock-up clutch;
a transmission system;
an engine;
a variable compression ratio mechanism for mechanically altering a piston displacement within each engine cylinder;
an exhaust passage including a particulate filter (PF), and each of a pressure sensor and a temperature sensor coupled upstream of the PF; and
a controller with computer readable instructions for:
responsive to each of a lower than threshold PF temperature while PF load is higher than a threshold load and the torque converter is locked, actuating the variable compression ratio mechanism to a position corresponding to a lower compression ratio (CR);
responsive to each of the lower than threshold PF temperature while the PF load is higher than a threshold load and the torque converter is locked, actuating the variable compression ratio mechanism to a position corresponding to a lower compression ratio (CR); and
responsive to PF temperature at the lower CR being lower than the threshold temperature, retarding spark timing towards an updated spark timing stability limit based on a residual gas fraction (RGF) in the cylinder at the lower CR.

19. The system of claim 18, wherein the RGF in the cylinder is estimated based on input from the pressure sensor at the lower CR, and wherein the updated spark timing stability limit is advanced towards maximum brake torque (MBT) as the RGF increases.

20. The system of claim 18, wherein the retarding spark timing includes retarding spark timing from MBT by an amount based on a difference between the PF temperature at the lower CR and the threshold temperature, the amount increased as the difference between the PF temperature at the lower CR and the threshold temperature increases, the threshold temperature based on the PF load.

* * * * *